(12) United States Patent
Björn et al.

(10) Patent No.: US 10,440,879 B2
(45) Date of Patent: Oct. 15, 2019

(54) ROBOTIC WORK TOOL

(71) Applicant: HUSQVARNA AB, Huskvarna (SE)

(72) Inventors: Jonathan Björn, Jönköping (SE); Martin Elonsson, Huskvarna (SE)

(73) Assignee: HUSQVARNA AB, Huskvarna (SE)

( * ) Notice: Subject to any disclaimer, the term of this patent is extended or adjusted under 35 U.S.C. 154(b) by 190 days.

(21) Appl. No.: 15/306,319

(22) PCT Filed: Apr. 25, 2014

(86) PCT No.: PCT/EP2014/058436
§ 371 (c)(1),
(2) Date: Oct. 24, 2016

(87) PCT Pub. No.: WO2015/161889
PCT Pub. Date: Oct. 29, 2015

(65) Prior Publication Data
US 2017/0042085 A1  Feb. 16, 2017

(51) Int. Cl.
*A01D 34/00* (2006.01)
*B60L 1/00* (2006.01)
*B60L 3/00* (2019.01)
*B60L 8/00* (2006.01)
*B60L 15/20* (2006.01)
(Continued)

(52) U.S. Cl.
CPC ........... *A01D 34/008* (2013.01); *A01D 34/78* (2013.01); *B60L 1/003* (2013.01); *B60L 3/0061* (2013.01); *B60L 8/003* (2013.01); *B60L 15/20* (2013.01); *B60L 50/52* (2019.02); *B60L 50/66* (2019.02); *B60L 53/16* (2019.02);

*A01D 34/64* (2013.01); *B60L 2200/40* (2013.01); *B60L 2240/36* (2013.01); *B60L 2240/421* (2013.01);
(Continued)

(58) Field of Classification Search
CPC .... A01D 34/008; A01D 34/78; B60L 11/1805
See application file for complete search history.

(56) References Cited

U.S. PATENT DOCUMENTS 5,781,960 A   7/1998  Kilstrom et al.
6,941,199 B1  9/2005  Bottomley et al.
(Continued)

FOREIGN PATENT DOCUMENTS

CN    102523841 A    7/2012
CN    202738445 U    2/2013
(Continued)

OTHER PUBLICATIONS

International Search Report & Written Opinion in International Application No. PCT/EP2014/058436 dated Jan. 5, 2015.
(Continued)

Primary Examiner — Faye M Fleming
(74) Attorney, Agent, or Firm — Burr & Forman LLP

(57) ABSTRACT

A robotic work tool system (200) comprising a robotic work tool (100), said robotic work tool (100) comprising a chassis (140B) and a body (140A) and at least one support pillar (310) arranged on one of the chassis (140B) and the body (140A) and a corresponding support surface (320) arranged on the other of the chassis (140B) and the body (140A), wherein the support pillar substantially bridges a distance between the chassis (140B) and the body (140A) thereby impairing any roll or tilt of the body (140A) relative the chassis (140B).

17 Claims, 4 Drawing Sheets

(51) Int. Cl.
*A01D 34/78* (2006.01)
*B60L 53/16* (2019.01)
*B60L 50/52* (2019.01)
*B60L 50/60* (2019.01)
*A01D 34/64* (2006.01)

(52) U.S. Cl.
CPC .......... *B60L 2260/32* (2013.01); *Y02T 10/645* (2013.01); *Y02T 10/7005* (2013.01); *Y02T 10/705* (2013.01); *Y02T 10/7072* (2013.01); *Y02T 10/7083* (2013.01); *Y02T 10/72* (2013.01); *Y02T 10/7275* (2013.01); *Y02T 90/14* (2013.01)

(56) References Cited

U.S. PATENT DOCUMENTS 9,241,441 B2 * 1/2016 Bjorn ................... H01H 27/00
2013/0061415 A1 3/2013 Samuels et al.
2017/0042087 A1 * 2/2017 Ohrlund ............... A01D 34/008
2017/0181375 A1 * 6/2017 Hashimoto ............ A01D 34/74
2018/0116109 A1 * 5/2018 Matsumoto .......... A01D 34/008

FOREIGN PATENT DOCUMENTS

| | | | | |
|---|---|---|---|---|
| DE | 102010044276 A1 | 3/2012 | | |
| EP | 0803224 A2 | 10/1997 | | |
| EP | 2425700 A2 | 3/2012 | | |
| EP | 2687077 A2 | 1/2014 | | |
| EP | 2014-C46337 | * | 5/2014 | ............. F16F 1/387 |
| WO | 03103375 A1 | 12/2003 | | |
| WO | 2013125992 A1 | 8/2013 | | |

OTHER PUBLICATIONS

International Preliminary Report on Patentability for International Application No. PCT/EP2014/058436 dated Oct. 25, 2016.

* cited by examiner

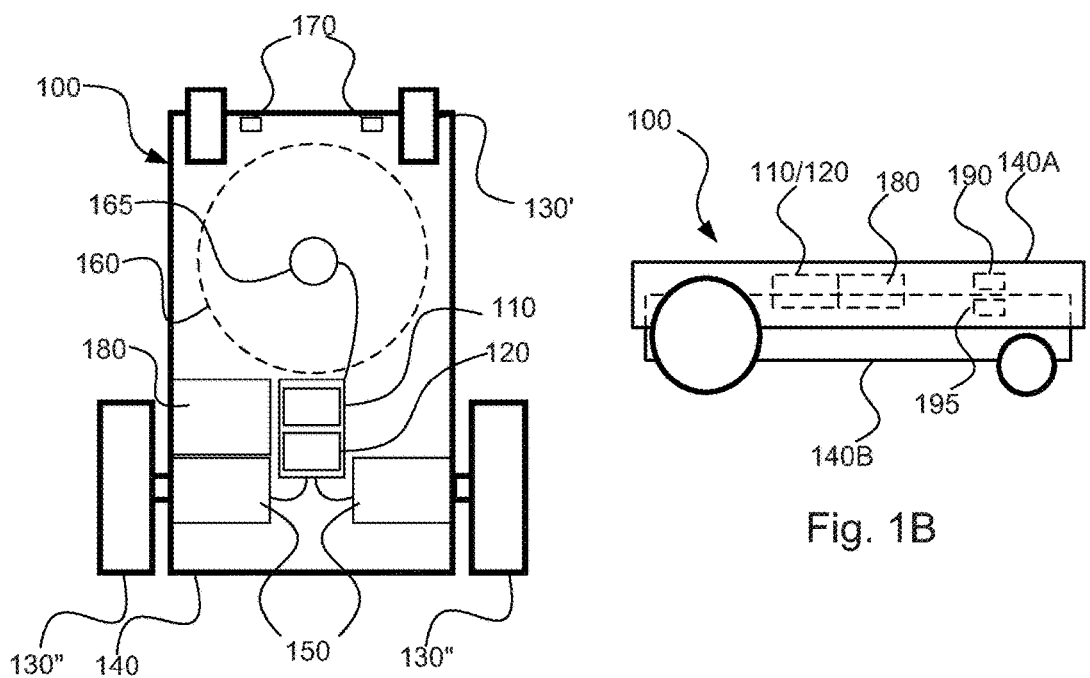
Fig. 1A
Fig. 1B
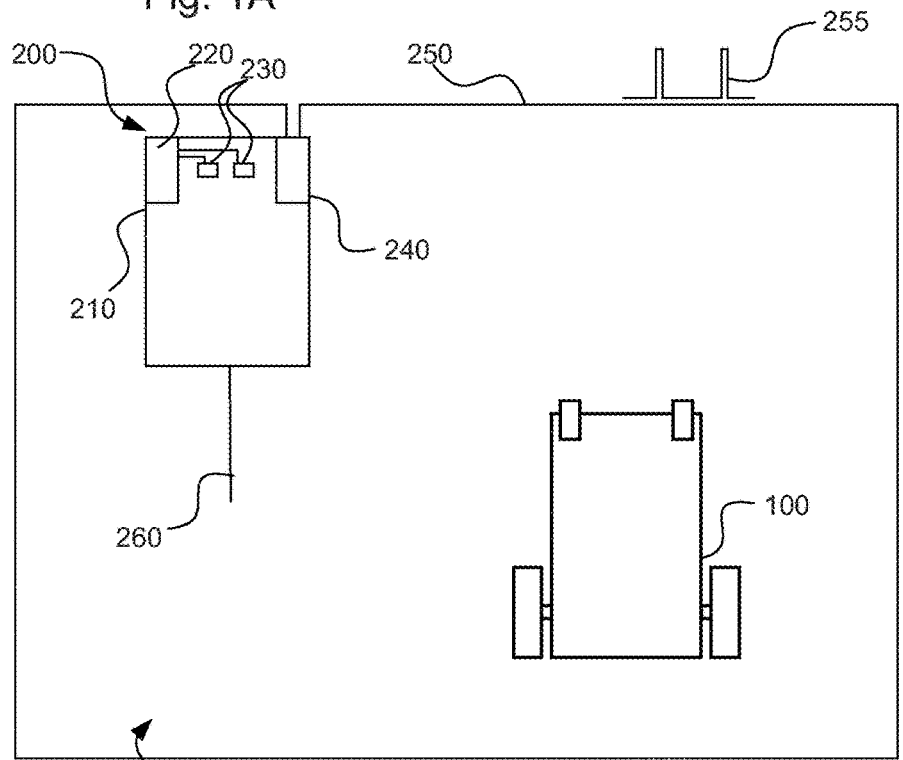
Fig. 2

ROBOTIC WORK TOOL

TECHNICAL FIELD

This application relates to a robotic work tool system for improved stability during operation, and in particular to a robotic work tool system for improved body stability during operation.

BACKGROUND

To enable for easier design and assembly of robotic work tools some models may be arranged with only three fixation points for attaching the body to the chassis of a robotic work tool. One assembly is with one fixation point in the front and two in the rear. However, this may cause the body to roll or become tilted during operation or by a slight misalignment when mounting.

Such roll or tilt may affect the lift and/or collision detection of the robotic work tool, which in turn may compromise the operational safety of the robotic work tool.

A solution could be to make the centrally located fixation point wider, thus giving more support. But, a wider fixation point would consume space and it would make the design of the robotic work tool more challenging.

Another solution would be to have one fixation point in each corner of the robotic work tool, however this would be counterproductive as the aim is to reduce the number of fixation points.

A third solution would be to simply tighten the fixation points harder. This would be the first solution that would come to mind—if something moves—tighten it. However, this has several disadvantages including that the body needs to have some degree of movement as otherwise the lift/collision detection may not work, and a too hard tightened fixation point may induce stress to the body which may lead to the body becoming damaged upon impact.

Although the description herein will be given to a robotic work tool having three fixation points it should be noted that the same problem lies with robotic work tools having two fixation points, where both are centrally located. Also, the same problem lies when a fixation point is located far from a side of the body of the robotic work tool. Far here meaning that the weight of the portion of the body extending from the fixation point becoming sufficient enough to influence the rigidity of the body and thereby affect the movement of the body. Designs where this may occur include the designs mentioned above and also a design where a fixation point at one end of the body is arranged at a corner of the body.

There is thus a need for a robotic work tool system that is able to operate with only three fixation points, or with centrally located fixation points.

SUMMARY

It is an object of the teachings of this application to overcome the problems listed above by providing a robotic work tool system comprising a robotic work tool, said robotic work tool comprising a chassis and a body and at least one support pillar arranged on one of the chassis and the body and a corresponding support surface arranged on the other of the chassis and the body, wherein the support pillar substantially bridges a distance between the chassis and the body thereby impairing any roll or tilt of the body relative the chassis.

In one embodiment the robotic work tool is a robotic lawnmower. In one embodiment the robotic work tool 100 is a farming equipment. In one embodiment the robotic work tool 100 is a golf ball collecting tool. The robotic work tool 100 may also be a vacuum cleaner, a floor cleaner, a street sweeper, a snow removal tool, a mine clearance robot or any other robotic work tool that is required to operate in a work area in a methodical and systematic or position oriented manner.

The inventors of the present invention have realized, after inventive and insightful reasoning, that the body of a robotic work tool may simply and elegantly be supported to prevent or at least impair the rolling or tilting of the body using the simple solution of support pillars arranged on one of the body and the chassis that only abut a corresponding support surface arranged on an opposite of the body or chassis which physically prevents vertical movement.

The support pillars need not be elastic or arranged with any telescopic function and thus are very cheap to manufacture and simple to install.

Other features and advantages of the disclosed embodiments will appear from the following detailed disclosure, from the attached dependent claims as well as from the drawings.

Generally, all terms used in the claims are to be interpreted according to their ordinary meaning in the technical field, unless explicitly defined otherwise herein. All references to "a/an/the [element, device, component, means, step, etc]" are to be interpreted openly as referring to at least one instance of the element, device, component, means, step, etc., unless explicitly stated otherwise. The steps of any method disclosed herein do not have to be performed in the exact order disclosed, unless explicitly stated.

BRIEF DESCRIPTION OF DRAWINGS

The invention will be described in further detail under reference to the accompanying drawings in which:

FIG. 1A shows a schematic overview of a robotic work tool according to one embodiment of the teachings of this application in a top view;

FIG. 1B shows a schematic overview of a robotic work tool according to one embodiment of the teachings of this application in a side view;

FIG. 2 shows a schematic view of a robotic work tool system according to one embodiment of the teachings of this application;

DETAILED DESCRIPTION

Figure 3:
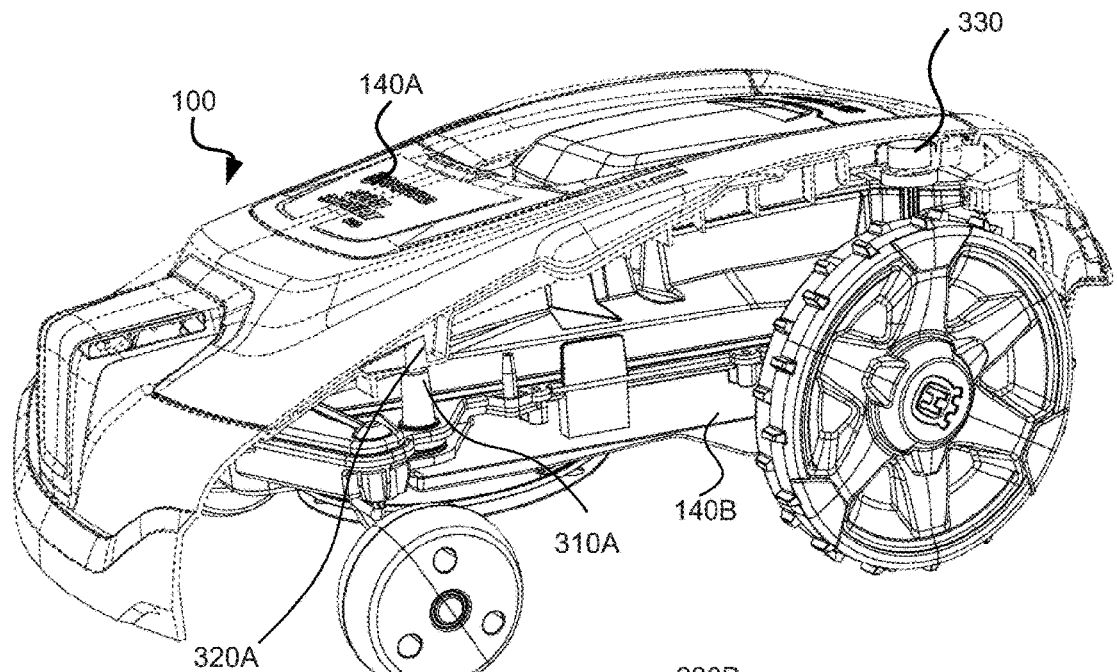
FIG. 3 shows a cut view from a side perspective of a robotic work tool according to one embodiment of the teachings of this application.

The disclosed embodiments will now be described more fully hereinafter with reference to the accompanying drawings, in which certain embodiments of the invention are shown. This invention may, however, be embodied in many different forms and should not be construed as limited to the embodiments set forth herein; rather, these embodiments are provided by way of example so that this disclosure will be thorough and complete, and will fully convey the scope of the invention to those skilled in the art. Like numbers refer to like elements throughout.

FIG. 1A shows a schematic overview of a robotic work tool 100 having a housing 140 and a plurality of wheels 130. In the exemplary embodiment of FIG. 1 the robotic work tool 100 has 4 wheels 130, two front wheels 130' and the rear wheels 130". At least some of the wheels 130 are drivably connected to at least one electric motor 150. It should be noted that even if the description herein is focussed on electric motors, combustion engines may alternatively be used possibly in combination with an electric motor.

In the example of FIG. 1, the rear wheels 130" are connected to each an electric motor 150. This allows for driving the rear wheels 130" independently of one another which, for example, enables steep turning.

The robotic work tool 100 also comprises a controller 110 which is configured to read instructions from a memory 120 and execute these instructions to control the operation of the robotic work tool 100.

The robotic work tool 100 further has at least one sensor 170 arranged to detect a magnetic field (not shown). The sensors are connected to the controller 110 and the controller 110 is configured to process any signals received from the sensors 170. The sensor signals may be caused by the magnetic field caused by a control signal being transmitted through a boundary wire (for more details on charging stations, control signals and boundary wires, see the description below with reference to FIG. 2). This enables the controller 110 to determine whether the robotic work tool 100 is inside or outside an area enclosed by a boundary wire.

The controller 110 is connected to the motors 150 for controlling the propulsion of the robotic work tool 100 which enables the robotic work tool 100 to service an enclosed area without leaving the area.

The robotic work tool 100 also comprises a work tool 160, which may be a grass cutting device, such as a rotating blade 160 driven by a cutter motor 165. The robotic work tool 100 is, in one embodiment, a robotic lawnmower.

The robotic work tool 100 may also have (at least) one battery 180 for providing power to the motors 150 and the cutter motor 165. Connected to the battery 180 are two charging connectors for receiving a charging current from a charger (referenced 220 in FIG. 2) of the charging station (referenced 210 in FIG. 2). Alternatively, the batteries may be solar charged.

FIG. 1B shows a schematic overview of the robotic work tool 100 wherein the housing comprises a body 140A and a chassis 140B. The chassis is adapted to carry most or all of the components of the robotic work tool 100, such as a controller/memory board 110/120 and the battery 180 to give a few examples. Other components are the sensor(s) 170 (not shown in FIG. 1B), the motor(s) 150 (not shown in FIG. 1B), the cutting tool 160 (not shown in FIG. 1B) and the cutting motor (not shown in FIG. 1B). The body 140A is arranged to cover the components to protect them from external influences.

The body 140A may be arranged with magnetic or spring based sensors 190 for example, adapted to detect if the body 140A is moved in relation to the chassis 140B. Corresponding sensor or sensor elements 195 are arranged on the chassis 140B. For the example of using magnetic sensors, a magnetic element 190 may be arranged on the body 140A and a corresponding magnetic sensor 195 (such as a Hall sensor) may be arranged on the chassis 140B. Should the magnetic element 190 move away from the magnetic sensor 195 (or a spring-based sensor be extended or compressed) a collision or lift has been detected. A movement upwards of the body 140A is indicative of a lift, and a movement in a substantially horizontal direction is indicative of a collision. The body 140A is thus arranged to operate as a part of a collision and/or a detection function.

The body 140 may comprise holes or openings adapted and placed to receive a connector, a key or key panel, and/or a display or display panel. In one embodiment the body 140A is all-encompassing when arranged on the chassis 140B, possibly in combination with any connector, key or keypad, and/or display or display panel arranged on the chassis 140B. In one embodiment the body 140A is all-encompassing when arranged at least from any user accessible surface when the robotic work tool is placed on the ground or arranged as during normal operation.

FIG. 2 shows a schematic view of a robotic work tool system 200 comprising a charging station 210 and a boundary wire 250 arranged to enclose a working area 205, the working area 205 not necessarily being a part of the robot system 200.

The robotic work tool 100 of FIG. 2 is a robotic work tool 100 such as disclosed with reference to FIG. 1. A charging station 210 has a charger 220 coupled to, in this embodiment, two charging connectors 230. The charging connectors 230 are arranged to co-operate with corresponding charging connectors 185 of the robotic work tool 100 for charging the battery 180 of the robotic work tool 100.

The charging station 210 also has, or may be coupled to, a signal generator 240 for providing a control signal 255 to be transmitted through the boundary wire 250. As is known in the art, the current pulses 255 will generate a magnetic field around the boundary wire 250 which the sensors 170 of the robotic work tool 100 will detect. As the robotic work tool 100 (or more accurately, the sensor 170) crosses the boundary wire 250 the direction of the magnetic field will change. The robotic work tool 100 will thus be able to determine that the boundary wire has been crossed.

FIG. 3 shows a cut view from a side perspective of a robotic work tool according to the teachings herein. In this figure, parts of the body 140A has been cut away to show the inside of the robotic work tool.

A fixation point 330 is visible at the end of the robotic work tool 100 in FIG. 3.

As can be seen a support pillar 310 is arranged on the chassis 140B. In this embodiment the support pillar 310 is a protrusion that extends away from the chassis 140B substantially bridging a distance between the chassis 140B and the body 140A.

The robotic work tool 100 is further arranged with a corresponding support surface 320 on the body 140B which is adapted to interact with the support pillar 310 during movement or operation of the robotic work tool 100. In this embodiment the support structure 320 is a raised part of the body 140A. The corresponding support surface 320 may be reinforced so as to better withstand impacts that may occur upon impact or collision.

The support pillar(s) thus prevent the body from rolling or tilting as the support pillar will physically stop any such rolling or tilting when being pressed against the corresponding support surface 320.

The support pillar(s) 310 is not attached to the corresponding support surface 320 and the two may move (freely) with regards to one another. The use of such support pillars 310 and corresponding support surfaces 320 thus enable the lift and/or collision detection to function unimpaired.

In one embodiment the support pillars 310 and the corresponding support surface(s) 320 are adapted to extend to substantially cover the distance between the chassis 140B and the body 140B, but to allow for a small gap 340 to exist between the support pillar 310 and the corresponding support surface 320. The size of the gap 340 allows for some movement and also for easier mounting. Also, the gap allows for some vertical movement of the body 140A such as upon a collision partially or wholly from above (such as when the robotic work tool drives in under an object, such as a chair). The size of the gap would be dependent on the design of the robotic work tool and also of the size of the robotic work tool 100. A larger design could operate with a larger gap as more movement of the body 140A could be accepted as a larger movement could actually correspond to a smaller angular movement. Also, a larger design could operate with a smaller gap as more movement of the body 140A would cause more stress on the fixation point depending on the material chosen for the body 140Z. Example values for the gap between the support pillar 310 and the corresponding support surface 320 are 0.5 mm, 1 mm, 1.25 mm, 1.5 mm, 2 mm or in the range 0.25 to 5 mm.

Figure 4:
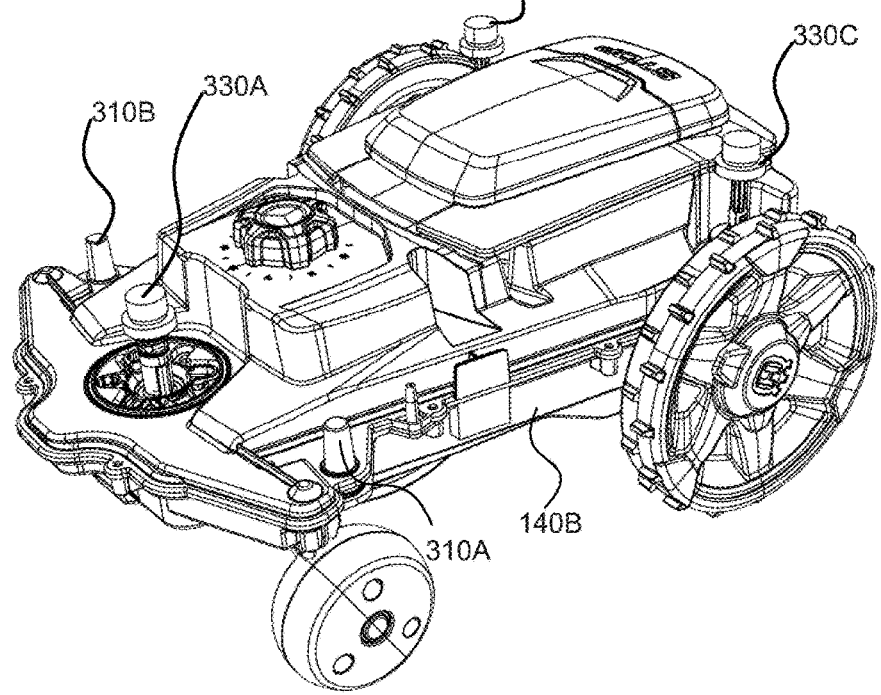
FIG. 4 shows a perspective view of a robotic work tool chassis according to one embodiment of the teachings of this application.

FIG. 4 shows a perspective view of a robotic work tool chassis 140B where two support pillars are arranged 310A and 310B. Three fixation points 330 are also clearly visible. One fixation point 330A at the front of the robotic work tool 100 and two fixation points 330B and 330C at the rear end of the robotic work tool 100.

The two support pillars 310A and 310B are arranged at each a side of the front fixation point 330A.

The two support pillars 310A and 310B are arranged at each a front corner of the chassis 140B. By arranging the support pillars 310 at a corner, most of the roll or tilt of the body 140A may be prevented.

Figure 5:
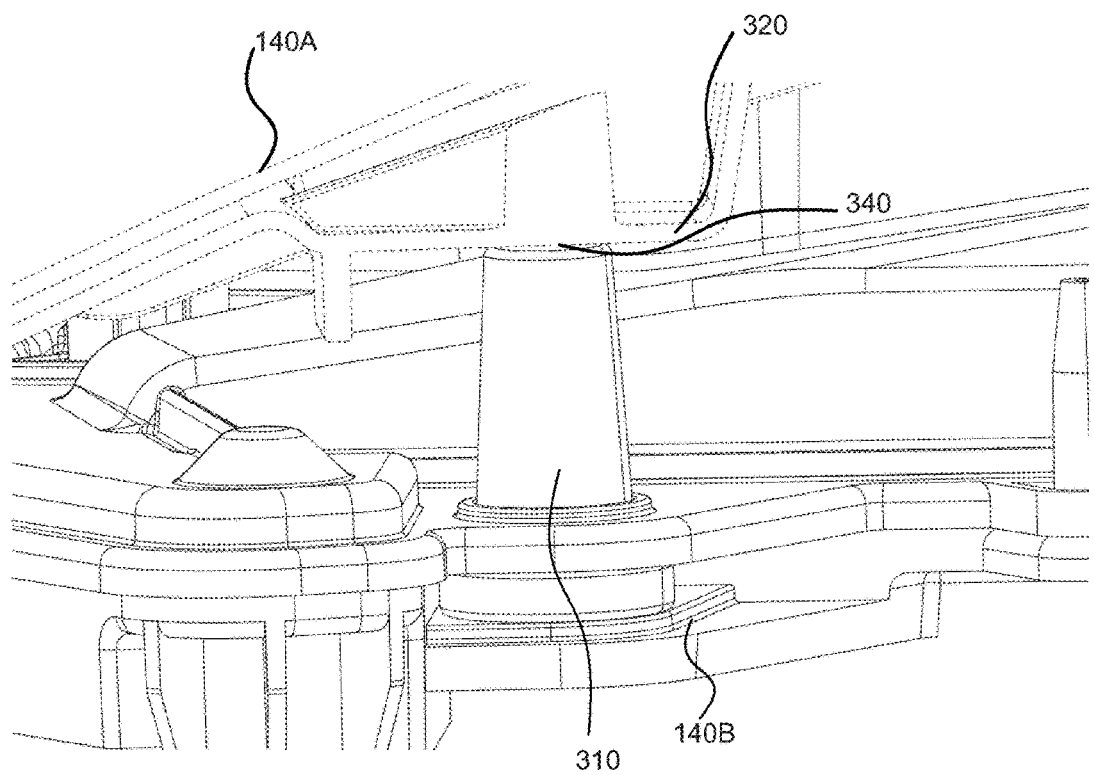
FIG. 5 shows a close up view of a support pillar and a corresponding support surface according to one embodiment of the teachings of this application.

FIG. 5 shows a close up view of a support pillar 310 and a corresponding support surface 320. Portions of the body 140A are shown in dashed lines and portions of the chassis 140B are shown in full lines. As can be seen the corresponding support surface 320 is raised and reinforced.

It should be noted that the support pillars 310 and the corresponding support surface 320 does not have to be elastic as they are only used for support. The support pillars 310 and the corresponding support surface 320 may also not be arranged with any telescopic function. This greatly simplifies the design of the robotic work tool as fewer such complicated arrangements (as in the fixation points) are needed while still providing lift and collision detection.

Furthermore the support pillar 310 is simple to manufacture as it can be moulded as part of the chassis 140B or the body 140A.

The corresponding support surface 320 is also simple to manufacture as it can be moulded as part of the body 140A or chassis 140B.

In one embodiment the support pillars 310 and/or the corresponding support surface 320 are made elastic to protect against movement caused by a rigid or hard collision. In such an embodiment the support pillar and/or the corresponding support surface may be made from rubber. A simple rubber support pillar is cheap to manufacture and easy to install.

It should be noted that the support pillar 310 is not attached to the corresponding support surface 320.

Figure 6:
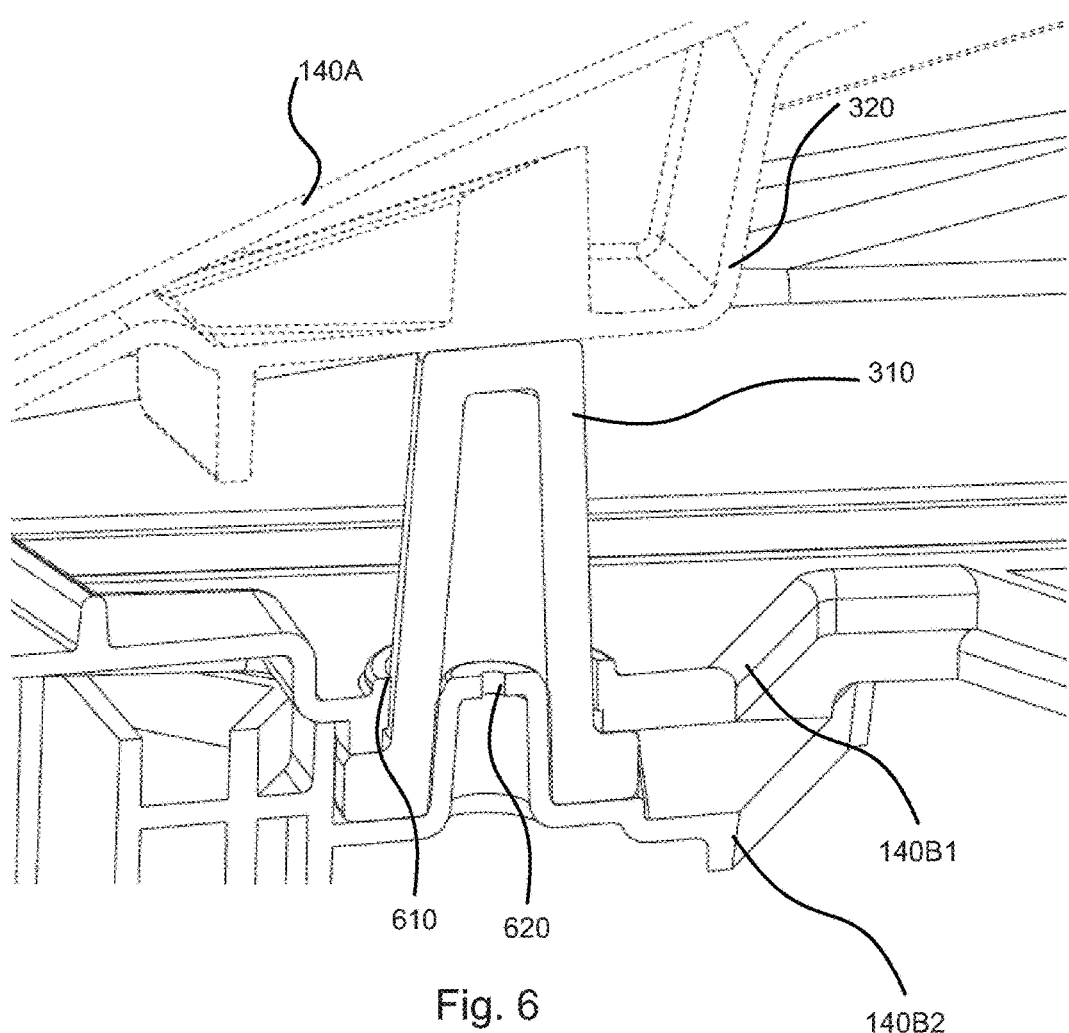
FIG. 6 shows a close up view of a support pillar 310 and its assembly according to one embodiment of the teachings of this application.

FIG. 6 shows a close up view of a support pillar 310 and a corresponding support surface 320. Portions of the body 140A are shown in dashed lines and portions of the chassis 140B are shown in full lines. In FIG. 6 the chassis 140B comprises two halves, an upper 140B1 and a lower 140B2. The support pillar 310 is attached to the chassis 140B by being pressed between the two chassis halves 140B1 and 140B2. The support pillar 310 Extends through a ole 610 in the upper chassis half 140B1 and is further stabilized by a cone or protrusion 620 extending from the lower chassis half 140B2 and into the support pillar 310.

This provides for a robust arrangement that is very easy (and cheap) to manufacture and assemble.

It should be noted that even though the disclosure herein is given with respect to support pillar(s) mounted on the chassis, they can also be mounted on the body 140A having a corresponding support surface on the chassis 140B. Also, some support pillar(s) may be arranged on the chassis and some on the body 140A.

The invention has mainly been described above with reference to a few embodiments. However, as is readily appreciated by a person skilled in the art, other embodiments than the ones disclosed above are equally possible within the scope of the invention, as defined by the appended patent claims.

The invention claimed is:

1. A robotic work tool system comprising a robotic work tool, wherein said robotic work tool is a robotic lawnmower, and wherein said robotic work tool comprises:
   a chassis:
   a body; and
   at least one support pillar arranged on one of the chassis or the body and a corresponding support surface arranged on the other of the chassis or the body,
   wherein said at least one support pillar substantially bridges a distance between the chassis and the body thereby impairing any roll or tilt of the body relative to the chassis, and wherein said at least one support pillar is not attached to said support surface.

2. The robotic work tool system according to claim 1, wherein said at least one support pillar is arranged at a side of a fixation point.

3. The robotic work tool system according to claim 1, wherein said at least one support pillar is arranged at a corner of said robotic work tool.

4. The robotic work tool system according to claim 1, wherein said at least one support pillar is arranged to extend substantially across said distance, but leave a gap between the at least one support pillar and the corresponding support surface.

5. The robotic work tool system according to claim 1, wherein said at least one support pillar extends vertically from said one of the chassis and the body toward said other of the chassis and the body.

6. A robotic work tool system comprising a robotic work tool, the robotic work tool comprising:
   a chassis;
   a body; and
   a support pillar arranged on one of the chassis or the body and a corresponding support surface arranged on the other of the chassis or the body,
   wherein the support pillar substantially bridges a distance between the chassis and the body thereby impairing any roll or tilt of the body relative to the chassis, and
   wherein the support pillar extends vertically from the one of the chassis or the body toward the other of the chassis or the body.

7. The robotic work tool system according to claim 6, wherein the support pillar is not attached to the corresponding support surface.

8. The robotic work tool system according to claim 6, wherein the robotic work tool is a robotic lawnmower.

9. The robotic work tool system according to claim 6, wherein the support pillar is arranged at a side of a fixation point.

10. The robotic work tool system according to claim 6, wherein the support pillar is arranged at a corner of the robotic work tool.

11. The robotic work tool system according to claim 6, wherein the support pillar is arranged to extend substantially across the distance, but leave a gap between the support pillar and the corresponding support surface.

12. A robotic work tool system comprising a robotic work tool, the robotic work tool comprising:
   a chassis;
   a body; and
   a support pillar arranged on one of the chassis or the body and a corresponding support surface arranged on the other of the chassis or the body,
   wherein the support pillar substantially bridges a distance between the chassis and the body thereby impairing any roll or tilt of the body relative to the chassis, and
   wherein a gap is defined between the support pillar and the corresponding support surface.

13. The robotic work tool system according to claim 12, wherein the support pillar is arranged at a side of a fixation point.

14. The robotic work tool system according to claim 12, wherein the support pillar is arranged at a corner of the robotic work tool.

15. The robotic work tool system according to claim 12, wherein the support pillar is arranged to extend substantially across the distance.

16. The robotic work tool system according to claim 12, wherein the robotic work tool is a robotic lawnmower.

17. The robotic work tool system according to claim 12, wherein the support pillar extends vertically from the one of the chassis or the body toward the other of the chassis or the body.

* * * * *